US008216054B2

(12) United States Patent
Okada

(10) Patent No.: US 8,216,054 B2
(45) Date of Patent: Jul. 10, 2012

(54) GAMING MACHINE THAT CHANGES THE NUMBER OF FREE GAMES DEPENDING ON GOLF GAME RESULT THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/217,893

(22) Filed: Aug. 25, 2011

(65) Prior Publication Data

US 2011/0306403 A1 Dec. 15, 2011

Related U.S. Application Data

(63) Continuation of application No. 12/021,991, filed on Jan. 29, 2008, now abandoned.

(60) Provisional application No. 60/907,278, filed on Mar. 27, 2007.

(51) Int. Cl.
*A63F 9/24* (2006.01)
*A63F 13/00* (2006.01)

(52) U.S. Cl. ................................ 463/20; 463/16; 463/25

(58) Field of Classification Search ........... 463/4, 16–22
See application file for complete search history.

(56) References Cited

U.S. PATENT DOCUMENTS

| | | | | |
|---|---|---|---|---|
| 6,155,925 | A * | 12/2000 | Giobbi et al. | 463/20 |
| 6,159,098 | A * | 12/2000 | Slomiany et al. | 463/25 |
| 6,312,334 | B1 * | 11/2001 | Yoseloff | 463/25 |
| 6,592,457 | B1 * | 7/2003 | Frohm et al. | 463/16 |
| 6,739,971 | B2 * | 5/2004 | Devaull | 463/20 |
| 6,786,818 | B1 * | 9/2004 | Rothschild et al. | 463/20 |
| 6,984,173 | B1 * | 1/2006 | Piechowiak et al. | 463/20 |
| 7,892,092 | B2 * | 2/2011 | Matthews et al. | 463/25 |
| 2002/0187827 | A1 * | 12/2002 | Blankstein | 463/20 |
| 2003/0027619 | A1 * | 2/2003 | Nicastro, Sr. | 463/16 |
| 2004/0002374 | A1 * | 1/2004 | Brown et al. | 463/20 |
| 2004/0005918 | A1 * | 1/2004 | Walker et al. | 463/16 |

* cited by examiner

*Primary Examiner* — Melba Bumgarner
*Assistant Examiner* — Steven J Hylinski
(74) *Attorney, Agent, or Firm* — Lexyoume IP Meister, PLLC.

(57) ABSTRACT

When a coin is bet, symbols are rearranged in several areas. A winning is determined on the basis of the rearranged symbols. A golf game is randomly started. A point is awarded to a player depending on a golf game result. A free game is continued depending on the awarded point.

3 Claims, 16 Drawing Sheets

FIG. 6

Code No. table

| | First symbol row | Second symbol row | Third symbol row | Fourth symbol row | Fifth symbol row |
|---|---|---|---|---|---|
| Code No. | symbol | symbol | symbol | symbol | symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

Payout management table

| winning combination | payout |
|---|---|
| PLUM | 5 |
| ORANGE | 8 |
| BELL | 10 |
| CHERRY | 20 |
| STRAWBERRY | 30 |
| BLUE 7 | 40 |

FIG. 8A

Free game-number table (basic game)

| accumulated point-number | free game-number |
|---|---|
| 0 | 10 |
| 1 | 20 |
| 2 | 40 |
| 3 | 60 |
| 4 | 80 |
| 5 | 100 |
| 6 | 120 |
| 7 | 140 |
| 8 | 160 |
| 9 | 180 |
| 10 | 200 |

FIG. 8B

Free game-number table (free game)

| point-number | extension times |
|---|---|
| 1 | 10 |

FIG. 9 mini game start determining table

| | random number range | |
|---|---|---|
| | basic game | free game |
| there is a mini game | 0 ~ 156 | 0 ~ 199 |
| there is no mini game | 157 ~ 256 | 200 ~ 256 |

FIG. 10 mini game result determining table

| | random number range |
|---|---|
| mini game failure | 0 ~ 200 |
| mini game success | 201 ~ 256 |

GAMING MACHINE THAT CHANGES THE NUMBER OF FREE GAMES DEPENDING ON GOLF GAME RESULT THEREOF

CROSS REFERENCE TO RELATED APPLICATION

This application claims the benefit of U.S. Provisional Application No. 60/907,278, filed on Mar. 27, 2007.

BACKGROUND OF THE INVENTION

1. Field of the Invention

The present invention relates to a gaming machine that changes the number of free games depending on a game result thereof.

2. Description of Related Art

According to the conventional slot machine, when a predetermined condition is satisfied in a basic game, a game state is provided which is referred to as a free game enabling a player to play a game without consuming a credit. When a game state is shifted to the free game state, a player can acquire many credits. For example, US20020025849 discloses a free game as a second game. In general, the number of free games (free game-number) is randomly determined. At this time, a predetermined free game-number is set.

The invention provides a gaming machine having new entertainment characteristics.

SUMMARY OF THE INVENTION

The invention provides a gaming machine having structures as described below. The gaming machine comprises a display, a bet unit that bets a value and a game controller. The display has several areas that arrange many symbols. The game controller is programmed to operate as described in (a)~(f). Specifically, the game controller is operated (a) to rearrange symbols in the several areas when a value is bet, (b) to determine a winning based on the symbols rearranged, (c) to randomly start a golf game, (d) to award a point to a player depending on a golf game result, (e) to shift from a basic game to a free game in which the value can be less consumed than in the basic game, when a predetermined condition is satisfied, and (f) to continue the free game depending on the awarded point.

The invention provides a gaming machine having structures as described below. The gaming machine comprises a display, a bet unit that bets a value and a game controller. The display has several areas that arrange many symbols. The game controller is programmed to operate as described in (a)~(g). Specifically, the game controller is operated (a) to rearrange symbols in the several areas when a value is bet, (b) to determine a winning based on the symbols rearranged, (c) to randomly start a golf game in a basic game, (d) to award a point to a player depending on a golf game result, (e) to accumulatively store the awarded point, (f) to shift from the basic game to a free game in which the value can be less consumed than in the basic game, when a predetermined condition is satisfied, and (g) to continue the free game depending on the stored point.

The invention provides a gaming machine having structures as described below. The gaming machine comprises a display, a bet unit that bets a value and a game controller. The display has several areas that arrange many symbols. The game controller is programmed to operate as described in (a)~(f). Specifically, the game controller is operated (a) to rearrange symbols in the several areas when a value is bet, (b) to determine a winning based on the symbols rearranged, (c) to shift from a basic game to a free game in which the value can be less consumed than in the basic game, when a predetermined condition is satisfied, (d) to randomly start a golf game in the free game, (e) to awards a point to a player depending on a golf game result, and (f) to extend the free game depending on the awarded point.

The invention provides a gaming machine having structures as described below. The gaming machine comprises a display, a bet unit that bets a value and a game controller. The display has several areas that arrange many symbols. The game controller is programmed to operate as described in (a)~(f). Specifically, the game controller is operated (a) to rearrange symbols in the several areas when a value is bet, (b) to determine a winning based on the symbols rearranged, (c) to randomly start a golf game in a basic game, (d) to award a point to a player depending on an operation of the player in the golf game, (e) to accumulatively store the awarded point, (f) to shift from the basic game to a free game in which the value can be less consumed than in the basic game, when a predetermined condition is satisfied, and (g) to continue the free game depending on the stored point.

The invention provides a gaming machine having structures as described below. The gaming machine comprises a display, a bet unit that bets a value and a game controller. The display has several areas that arrange many symbols. The game controller is programmed to operate as described in (a)~(f). Specifically, the game controller is operated (a) to rearrange symbols in the several areas when a value is bet, (b) to determine a winning based on the symbols rearranged, (c) to shift from a basic game to a free game in which the value can be less consumed than in the basic game, when a predetermined condition is satisfied, (d) to randomly start a golf game in the free game, (e) to award a point to a player depending on an operation of the player in the golf game, and (f) to extend the free game depending on the awarded point.

The invention provides a gaming method of a gaming machine repeating a unit game in which many symbols are rearranged in several areas. The method comprises steps of: (a) rearranging symbols in the several areas when a value is bet, (b) determining a winning based on the symbols rearranged, (c) randomly starting a golf game, (d) awarding a point to a player depending on a golf game result, (e) shifting from a basic game to a free game in which the value can be less consumed than in the basic game, when a predetermined condition is satisfied, and (f) continuing the free game depending on the awarded point.

The invention provides a gaming method of a gaming machine repeating a unit game in which many symbols are rearranged in several areas. The method comprises steps of: (a) rearranging symbols in the several areas when a value is bet, (b) determining a winning based on the symbols rearranged, (c) randomly starting a golf game in a basic game, (d) awarding a point to a player depending on a golf game result, (e) accumulatively storing the awarded point, (f) shifting from the basic game to a free game in which the value can be less consumed than in the basic game, when a predetermined condition is satisfied, and (g) continuing the free game depending on the stored point.

The invention provides a gaming method of a gaming machine repeating a unit game in which many symbols are rearranged in several areas. The method comprises steps of: (a) rearranging symbols in the several areas when a value is bet, (b) determining a winning based on the symbols rearranged, (c) shifting from a basic game to a free game in which the value can be less consumed than in the basic game, when a predetermined condition is satisfied, (d) randomly starting a golf game in the free game, (e) awarding a point to a player depending on a golf game result, and (f) extending the free game depending on the awarded point.

The invention provides a gaming method of a gaming machine repeating a unit game in which many symbols are rearranged in several areas. The method comprises steps of: (a) rearranging symbols in the several areas when a value is bet, (b) determining a winning based on the symbols rearranged, (c) randomly starting a golf game in a basic game, (d) awarding a point to a player depending on an operation of the player in the golf game, (e) accumulatively storing the awarded point, (f) shifting from the basic game to a free game in which the value can be less consumed than in the basic game, when a predetermined condition is satisfied, and (g) continuing the free game depending on the stored point.

The invention provides a gaming method of a gaming machine repeating a unit game in which many symbols are rearranged in several areas. The method comprises steps of: (a) rearranging symbols in the several areas when a value is bet, (b) determining a winning based on the symbols rearranged, (c) shifting from a basic game to a free game in which the value can be less consumed than in the basic game, when a predetermined condition is satisfied, (d) randomly starting a golf game in the free game, (e) awarding a point to a player depending on an operation of the player in the golf game, and (f) extending the free game depending on the awarded point.

BRIEF DESCRIPTION OF THE DRAWINGS

FIG. 6 shows symbols and code numbers of the symbols;

FIG. 7 shows a payout management table;

FIG. 8A shows a free game-number table;

FIG. 8B shows a free game-number table;

FIG. 9 shows a mini game start determining table;

FIG. 10 shows a mini game result determining table;

DESCRIPTION OF THE PREFERRED EMBODIMENTS (Embodiments)

Hereinafter, an embodiment of a gaming machine according to the invention will be described.

(Outline of a Gaming Machine)

Figure 1:
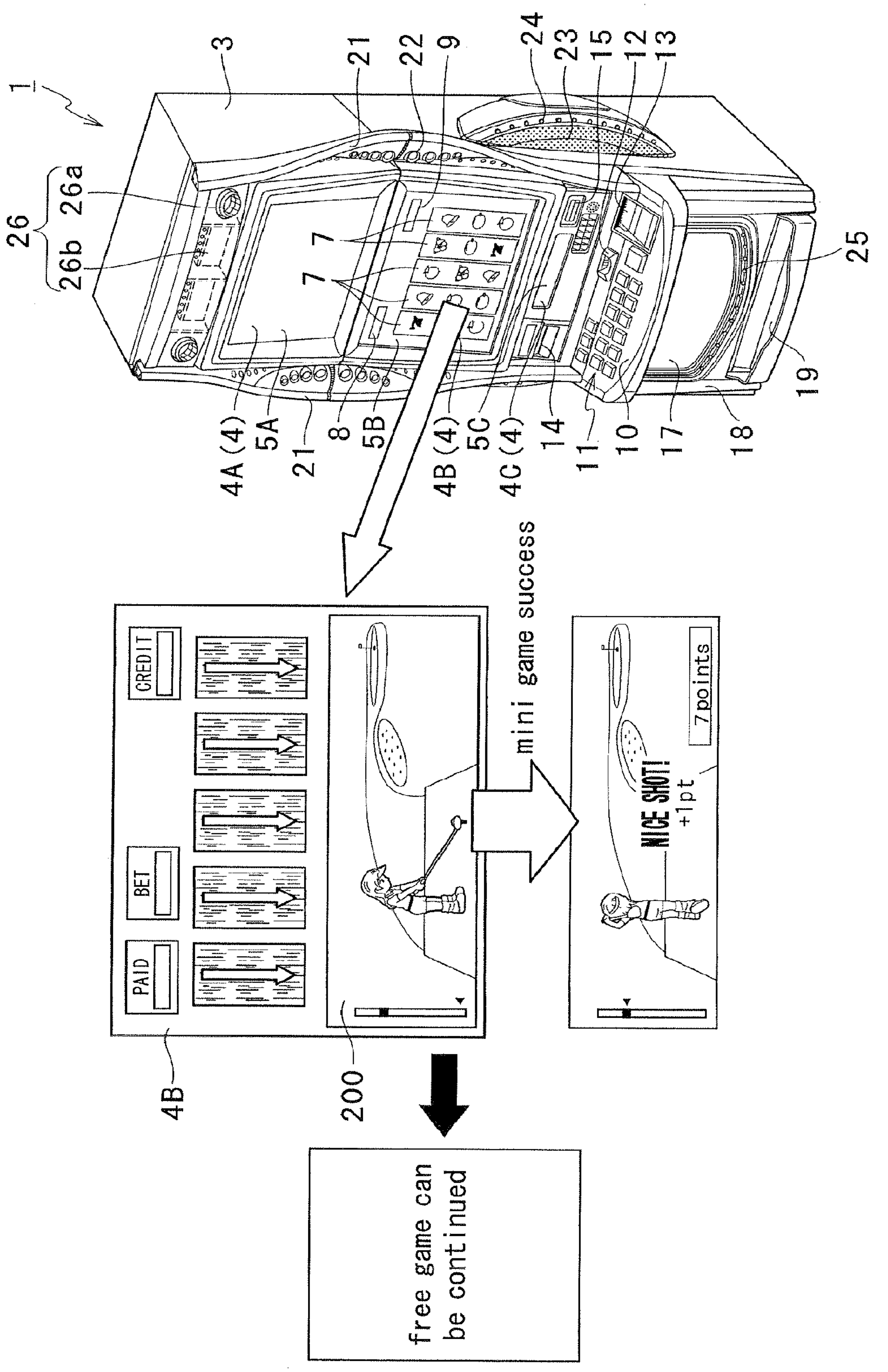
FIG. 1 illustrates a gaming method of a slot machine.
Figure 4:
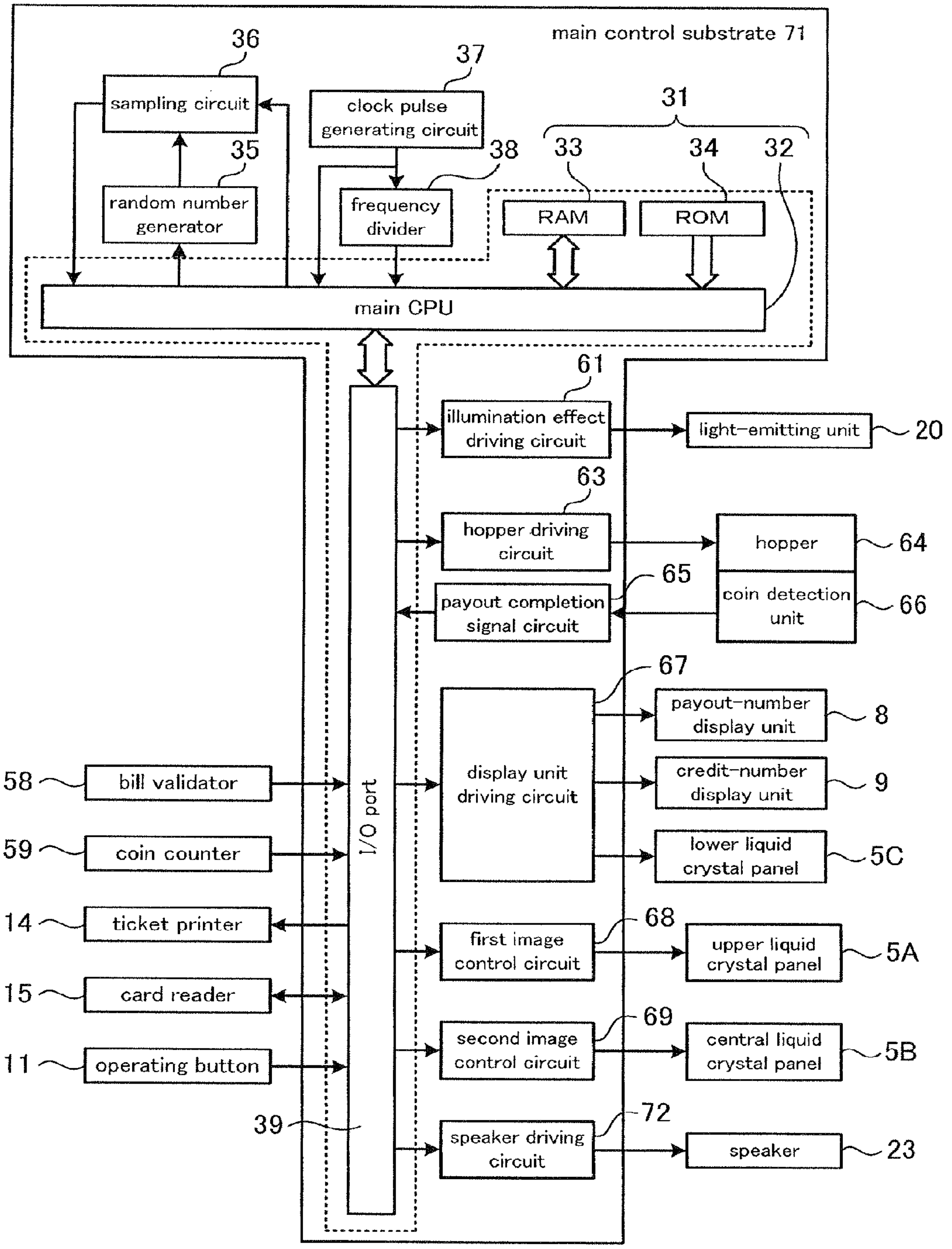
FIG. 4 is a block diagram showing a control circuit of a slot machine.

As shown in FIGS. 1 and 4, a gaming machine (slot machine) 1 comprises a display (central variable display unit 4B, central liquid crystal panel 5B) having several areas (display windows 7A~7E) that arrange many symbols (symbols 180), a bet unit (coin insertion slot 12, operating buttons 11) that bets a value (coin) and a game controller (microcomputer 31, main CPU 32) that is programmed to operate as described in steps (a)~(f).

In a step (a), the game controller is programmed to rearrange symbols in several areas when a value is bet. In a step (b), the game controller is programmed to determine a winning on the basis of the symbols rearranged. In a step (c), the game controller is programmed to start randomly a golf game. In a step (d), the game controller is programmed to award a point to a player depending on a golf game result. In a step (e), the game controller is programmed to shift from a basic game to a free game in which the value can be less consumed than in the basic game, when a predetermined condition is satisfied. In a step (f), the game controller is programmed to continue the free game depending on the awarded point.

Thereby, the gaming machine executes a gaming method comprising steps of rearranging the symbols 180 in the display windows 7A~7E, when a coin is bet; determining a winning on the basis of the symbols 180 rearranged; randomly starting a golf game; awarding a point to a player depending on a golf game result; shifting from a basic game to a free game in which the coin to be bet can be less consumed than in the basic game, when a predetermined condition is satisfied; and continuing the free game depending on the awarded point.

Herein, the "gaming machine" may be a slot machine 1 for a single player or may be a multiplayer-type gaming machine that allows participation of two or more players. For example, the multiplayer-type gaming machine may consist of several slot machines 1 that are connected to each other in a data communication manner. In addition, the gaming machine may execute any of a mechanically operating game, an electrically operating game and a mechanically and electrically operating game. As the mechanically operating game, there is a slot machine 1 having reels that are realistically manufactured. In addition, as the electrically operating game, there is a slot machine 1 that displays a reel image in a display device such as liquid crystal monitor and virtually rotates or moves it. Meanwhile, in this embodiment, the invention provides the slot machine 1 as the gaming machine. However, it should be noted that the invention is not limited thereto.

The "display" may include a liquid crystal display device, a CRT (cathode-ray tube) device, a plasma display device and the like. In addition, a single or several displays may be provided to the slot machine 1. Moreover, in the case of the multiplayer-type gaming machine, the display may be respectively provided to each of the slot machines 1. Alternatively, a large-scale display that is commonly used for all the slot machines 1 may be provided separately from the slot machines 1.

In addition, the "basic game" is an original main game of the gaming machine and a game that is executed in a base game state. For example, in the slot machine 1, the basic game is a slot game in which the symbols are variably displayed and a value is awarded on the basis of the stop display result. Meanwhile, the "value" includes a medal, coin, gaming ball, money, bill, magnetic card the like.

Furthermore, the "free game" is a game in which a player can play a game over the predetermined number of times without betting a coin. The free game is a type of a bonus game. The bonus game is a gaming state that is more advantageous than the basic game. Meanwhile, the bonus game is not particularly limited as long as it is a gaming state that is advantageous to a player, i.e., it is more advantageous than the basic game. For example, the bonus game may include a state in which more values can be acquired than in the basic game, a state in which a value can be acquired in a higher probability than the basic game, a state in which the value is less consumed than in the basic game and the like.

The "golf game" is a game that is different from the original main game of the gaming machine and is executed simultaneously with the basic game or executed at one time period during a stop period of the basic game. In the golf game of this embodiment, it is possible to input an intensity of shot that a player hits a ball. The golf game may be a game as "driving contest" or may be a putting game allowing only one putting on a green. Hereinafter, the golf game different from the main game is referred to as mini game.

In addition, the "arrangement" means a state in which an outside player can identify the symbols 180 with naked eyes. Meanwhile, the "rearrangement" is meant by arranging the symbols 180 again after dismissing the arrangement of the symbols 180. Furthermore, the "predetermined condition" is determined on the basis of the rearrangement result on a pay line. The "pay line" is provided to determine a combination of the symbols 180. In other words, when the symbols 180 are rearranged on and out of the pay line L, a combination is determined for only the symbols 180 rearranged on the pay line. As a result of the determination for a combination, when it is made a winning combination, it is carried out, for example, a process of paying out a coin based on the winning combination.

Additionally, the "point" is generated as a result that a mini game ends in success. The number of points has an effect on the free game-number. The pay line L, the symbols 180, the winning combination and the golf game will be specifically described below.

In addition, the game controller may be structured to operate programs of steps (a)~(g)

In a step (a), the game controller is programmed to rearrange symbols in several areas. In a step (b), the game controller is programmed to determine a winning on the basis of the symbols rearranged. In a step (c), the game controller is programmed to randomly start a golf game in a basic game. In a step (d), the game controller is programmed to award a point to a player depending on a golf game result. In a step (e), the game controller is programmed to accumulatively store the awarded point. In a step (f), the game controller is programmed to shift from the basic game to a free game in which the value can be less consumed than in the basic game, when a predetermined condition is satisfied. In a step (g), the game controller is programmed to continue the free game depending on the stored point.

Thereby, the gaming machine executes a gaming method comprising steps of rearranging symbols in several areas, when a value is bet; determining a winning on the basis of the symbols rearranged; randomly starting a golf game in a basic game; awarding a point to a player depending on a golf game result; accumulatively storing the awarded point; shifting from the basic game to a free game in which the value can be less consumed than in the basic game, when a predetermined condition is satisfied; and continuing the free game depending on the stored point.

In addition, the game controller may be structured to operate programs of steps (a)~(f)

In a step (a), the game controller is programmed to rearrange symbols in several areas when a value is bet. In a step (b), the game controller is programmed to determine a winning on the basis of the symbols rearranged. In a step (c), the game controller is programmed to shift from the basic game to a free game in which the value can be less consumed than in the basic game, when a predetermined condition is satisfied. In a step (d), the game controller is programmed to randomly start a golf game in the free game. In a step (e), the game controller is programmed to award a point to a player depending on a golf game result. In a step (f), the game controller is programmed to extent the free game depending on the awarded point.

Thereby, the gaming machine executes a gaming method comprising steps of rearranging symbols in several areas, when a value is bet; determining a winning on the basis of the symbols rearranged; shifting from the basic game to a free game in which the value can be less consumed than in the basic game, when a predetermined condition is satisfied; randomly starting a golf game in the free game; awarding a point to a player depending on a golf game result; and extending the free game depending on the awarded point.

In addition, the game controller may be structured to operate programs of steps (a)~(g)

In a step (a), the game controller is programmed to rearrange symbols in several areas, when a value is bet. In a step (b), the game controller is programmed to determine a winning on the basis of the symbols rearranged. In a step (c), the game controller is programmed to randomly start a golf game in a basic game. In a step (d), the game controller is programmed to award a point to a player depending on an operation of the player in the golf game. In a step (e), the game controller is programmed to accumulatively store the awarded point. In a step (f), the game controller is programmed to shift from the basic game to a free game in which the value can be less consumed than in the basic game, when a predetermined condition is satisfied. In a step (g), the game controller is programmed to continue the free game depending on the stored point.

Thereby, the gaming machine executes a gaming method comprising steps of rearranging symbols in several areas, when a value is bet; determining a winning on the basis of the symbols rearranged; randomly starting a golf game in a basic game; awarding a point to a player depending on an operation of the player in the golf game; accumulatively storing the awarded point; shifting from the basic game to a free game in which the value can be less consumed in the basic game, when a predetermined condition is satisfied; and continuing the free game depending on the stored point.

In addition, the game controller may be structured to operate programs of steps (a)~(f)

In a step (a), the game controller is programmed to rearrange symbols in several areas, when a value is bet. In a step (b), the game controller is programmed to determine a winning on the basis of the symbols rearranged. In a step (c), the game controller is programmed to shift from a basic game to a free game in which the value can be less consumed than in the basic game, when a predetermined condition is satisfied. In a step (d), the game controller is programmed to randomly start a golf game in the free game. In a step (e), the game controller is programmed to award a point to a player depending on an operation of the player in the golf game. In a step (f), the game controller is programmed to extend the free game depending on the awarded point.

Thereby, the gaming machine executes a gaming method comprising steps of rearranging symbols in several areas, when a value is bet; determining a winning on the basis of the symbols rearranged; shifting from a basic game to a free game in which the value can be less consumed than in the basic game, when a predetermined condition is satisfied; randomly starting a golf game in the free game; awarding a point to a player depending on an operation of the player in the golf game; and extending the free game depending on the awarded point.

(Mechanical Structure of the Slot Machine 1)

In the followings, an embodiment of the slot machine 1 that is electrically and mechanically structured is specifically described.

Figure 2:
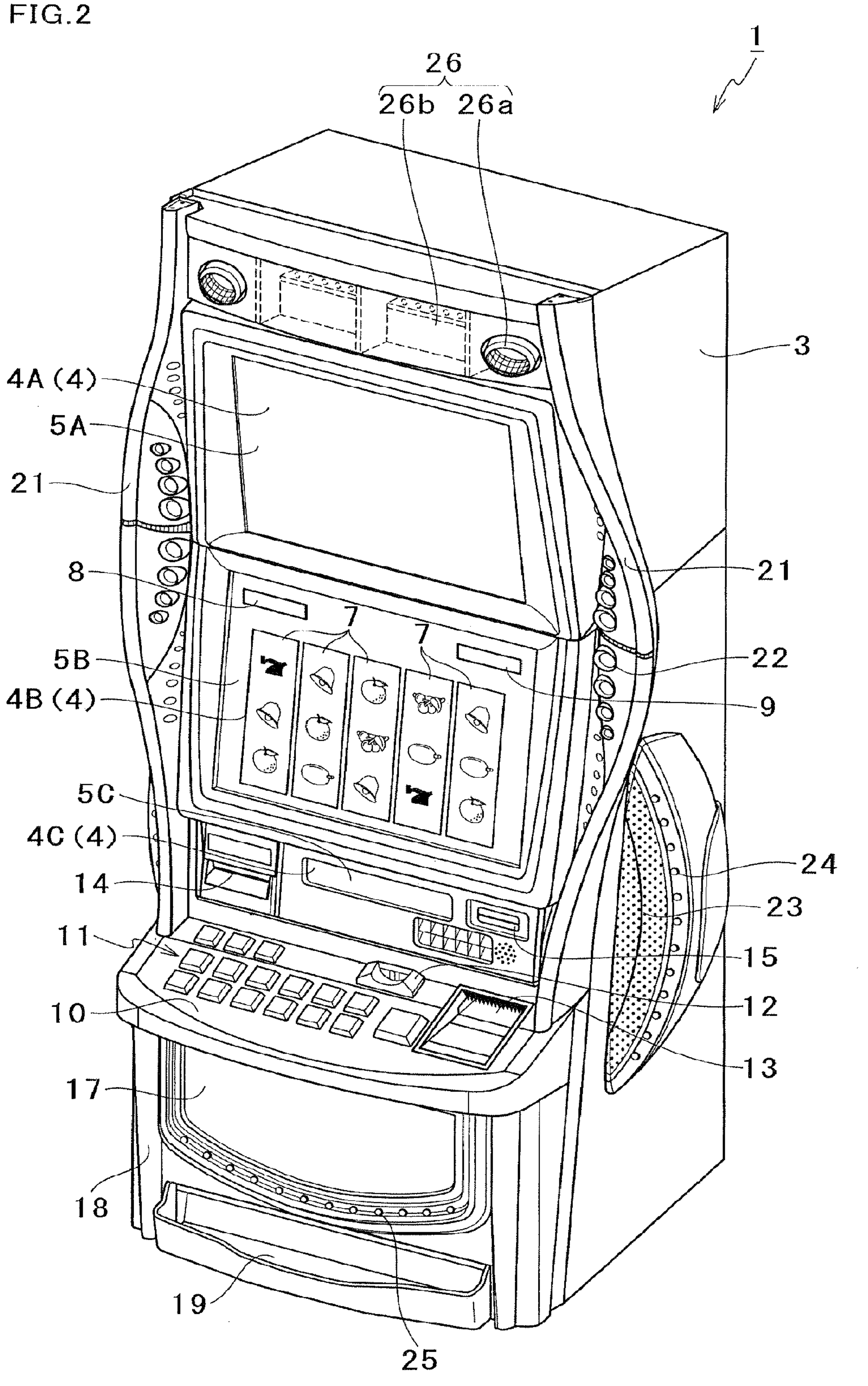
FIG. 2 is a perspective view showing an external appearance of a slot machine.

As shown in FIG. 2, the slot machine 1 is an upright-type slot machine and has a cabinet 3 for accommodating electrical or mechanical parts that are provided to execute a predetermined game aspect. The slot machine is provided with a display 4 for displaying game information based on a game operation of a player. The display 4 has an upper variable display unit 4A, a central variable display unit 4B and a lower variable display unit 4C.

The upper variable display unit 4A has an upper transparent liquid crystal panel 5A that is fixed to a front door of the cabinet 3. In the upper liquid crystal panel 5A, an effect such as character (not shown) is carried out.

Figure 3:
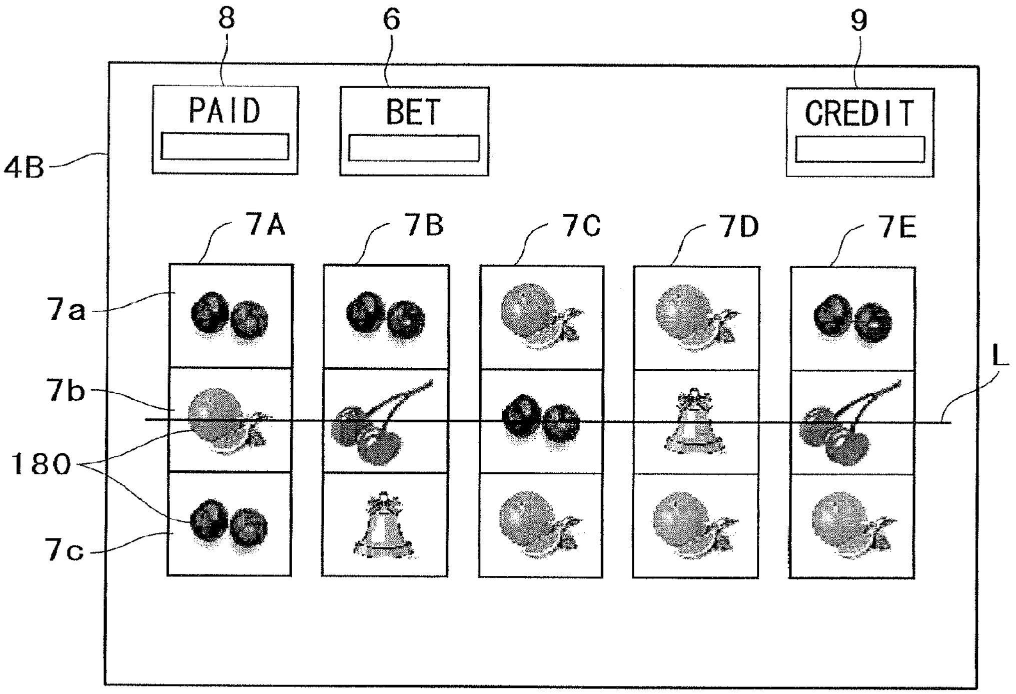
FIG. 3 illustrates a display screen.

The central variable display unit 4B is a rotating symbol display panel that a player always observes closely, and has a central transparent liquid crystal panel 5B that is fixed to the front door of the cabinet 3. As shown in FIG. 3, five display windows 7A, 7B, 7C, 7D, 7E are displayed in the central liquid crystal panel 5B. Moreover, a single pay line L, which horizontally traverses the five display windows 7A, 7B, 7C, 7D, 7E, is displayed in the central liquid crystal panel 5B. When a winning is made, an effect of a moving picture is carried out in the central liquid crystal panel 5B. In addition, a bet-number display unit 6, a payout-number display unit 8 or a credit-number display unit 9 is displayed in an upper part of the central liquid crystal panel 5B.

Symbol rows consisting of the symbols 180 are scroll-displayed in the display windows 7A, 7B, 7C, 70, 7E. In addition, each of the display windows 7A, 7B, 7C, 7D, 7E is divided into an upper stage 7*a*, a central stage 7*b* and a lower stage 7*c*. The symbols 180 are respectively stopped (arranged) in the respective stages 7*a*, 7*b*, 7*c*. For example, in FIG. 3, "PLUM" is stopped in the upper stage 7*a* of the display window 7A, "ORANGE" is stopped in the central stage 7*b* of the display window 7A and "PLUM" is stopped in the lower stage 7*c* of the display window 7A. Thereby, the display windows 7A, 7B, 7C, 70, 7E display a symbol matrix consisting of 5 columns and 3 rows. In the mean time, the symbol matrix is not limited to 5 columns and 3 rows.

In addition, the pay line L is provided to determine a combination of the symbols 180. In other words, when the symbols 180 are rearranged on and out of the pay line L, a combination is determined for only the symbols 180 rearranged on the pay line. As a result of the determination for a combination, when it is made a winning combination, it is carried out, for example, a process of paying out a coin based on the winning combination.

In addition, in this embodiment, when the symbols stopped on the pay line L constitute a predetermined combination, a process of paying out a coin, for example, is carried out. However, when the predetermined number of symbols referred to as scattered symbols is displayed, a coin may be paid out, irrespective of the pay line L.

In addition, a mini game screen 200 (refer to FIG. 1) that executes a mini game is displayed in a lower part of the display windows 7A, 7B, 7C, 7D, 7E. The mini game screen 200 is not always displayed but is displayed during the mini game. The mini game is randomly started and executed over the predetermined number of times.

The lower variable display unit 4C has a lower liquid crystal panel 5C that displays a point-number recorded in a card or a game point-number. The numerical value displayed in the lower liquid crystal panel 5C is based on a display result of the central variable display unit 4B. When a winning combination is made in the central variable display unit 4B, the game point-number that is displayed in the lower liquid crystal panel 5C is calculated on the basis of the winning combination made. A ticket printer 14 is provided to a left side of the lower liquid crystal panel 5C and a card reader 15 is provided to a right side of the lower liquid crystal panel 5C.

An operating table 10 that protrudes from the front face of the cabinet 3 is disposed below the lower variable display unit 5C. On the operating table 10, there are arranged operating buttons 11 (for example, bet button, collect button, start button, stop button and the like) as an operating unit enabling a player to operate a game. In addition, a coin insertion slot and a bill insertion slot 13 are provided to the operating table 10.

A waist-position panel 17 is disposed below the operating table 10. The waist-position panel 17 is a plastic panel having a game-related image printed thereto. The waist-position panel 17 is fixed to a lower front door 18 and illuminated by a cold cathode-ray tube. In addition, a coin tray 19 that collects coins, which are paid out on the basis of a game result, is disposed below the waist-position panel 17.

Furthermore, a light-emitting unit 20 is disposed to the cabinet 3 of the slot machine 1 so that it surrounds a game area including the upper variable display unit 4A, the central variable display unit 4B, the lower variable display unit 4C and the operating table 10. The light-emitting unit 20 comprises side lamps 22 that are provided to inclined parts 21, which are protruded in a bow shape at front right and left ends of the cabinet 3 and at side parts over the upper variable display unit 4A, the central variable display unit 4B and the lower variable display unit 4C, speaker lamps 24 that are provided to arc-shaped speaker 23, which are sideways protruded at the right and left ends of the cabinet 3 adjacent to the operating table 10, and are arranged along edges of the speakers 24, under lamps 25 that are provided to the lower front door 18 and arranged along lower edges of the waist-position panel 17, and top lamps 26 that are provided to an upper part of the upper variable display unit 4A and have power lamps 26*a* disposed at both sides and central band-shaped lamps 26*b* arranged in a horizontal direction.

(Electrical Structure of the Slot Machine 1)

FIG. 4 is a block diagram showing an overall electrical structure of the slot machine 1. As shown in FIG. 4, the slot machine 1 has many components about a main control substrate 71 including a microcomputer 31. The main control substrate 71 has a microcomputer 31, a random number generator 35, a sampling circuit 36, a clock pulse generating circuit 37, a frequency dividing circuit 38, an illumination effect driving circuit 61, a hopper driving circuit 63, a payout completion signal circuit 65, a display unit driving circuit 67, a first image control circuit 68, a second control circuit 69 and a speaker dividing circuit 72.

The microcomputer 31 has a main CPU 32, a RAM 33 and a ROM 34. The main CPU 32 operates in accordance with a program stored in the ROM 34 and executes an input/output of a signal to and from the other components, thereby controlling an overall operation of the slot machine 1. In addition, the RAM 33 serves as a temporary storage means when the main CPU 32 operates. The ROM 34 stores data or program used when the main CPU 32 operates. For example, a random number value that is sampled by the sampling circuit 36 is temporarily maintained in the ROM after a game starts. In addition, a payout management table shown in FIG. 7, a free game-number table shown in FIG. 8, a mini game start determining table shown in FIG. 9 and a mini game result determining table shown in FIG. 10 are stored in the ROM. In addition to, the ROM 34 stores a program that is executed by the main CPU 32 and permanent data.

The random number generator 35 is operated in accordance with an instruction of the main CPU 32 and generates a random number within a predetermined range. The sampling circuit 36 samples any random number of the random numbers that are generated by the random number generator 35 in accordance with an instruction of the main CPU 32 and inputs the sampled random number into the main CPU 32. The clock pulse generating circuit 37 generates a reference clock for operating the main CPU 32 and the frequency dividing circuit 38 inputs a signal that the reference clock is divided in a predetermined period to the main CPU 32.

In addition, the main control substrate 71 is connected with the operating buttons 11 including a stop button for inputting an instruction to stop the scroll of the symbol rows, a start button, a collect button, a bet button and the like and allows signals corresponding to the push of the buttons to be inputted into the main CPU 32 via the I/O port 39.

In addition, the main control substrate 71 is connected with a bill validator 58, a coin counter 59, a ticket printer 14 and a card reader 15.

The bill validator 58 reads an image of bill inserted into the bill insertion slot 13 and receives the normal bill in the cabinet 3. In addition, when receiving the normal bill, the bill validator 58 outputs an input signal to the main CPU 32 based on an amount of the bill. The main CPU 32 stores a credit-number in the RAM 33, which corresponds to the amount of bill transmitted by the input signal.

The coin counter 59 is provided in the coin insertion slot and identifies whether the coin inserted into the coin insertion slot 12 is normal or not. The abnormal coin is discharged to the coin tray 19. In addition, the coin counter 59 outputs an input signal to the main CPU 32 when it detects a normal coin.

The ticket printer 14 prints a barcode on a ticket, in which data such as credit-number stored in the RAM 33, the day and time and identification number of the slot machine 1 is coded, based on the control signal outputted from the main CPU 32, and then outputs a ticket having the barcode.

The card reader 15 reads the data from a smart card to transmit it to the main CPU 32, or writes the data to the smart card based on a control signal from the main CPU 32.

The illumination effect driving circuit 61 outputs an effect signal that causes the light-emitting unit 20 to execute an illumination effect. The light-emitting unit 20 consists of many lamps or LED including the side lamps 22, the speaker lamps 24, the under lamps 25 and the top lamps 26.

The hopper driving circuit 63 drives a hopper 64 under control of the main CPU 32. The hopper 64 executes an operation of paying out a coin and pays out the coin to the coin tray 19. The payout completion signal circuit 65 inputs data of the coin-number from a coin detection unit 66 connected thereto and inputs a signal, which notifies payout completion of the coin when the coin-number reaches a predetermined number, to the main CPU 32. The coin detection unit 66 measures the number of coins paid out by the hopper 64 and inputs data of the measured number to the payout completion signal circuit 65. The display unit driving circuit 67 controls display operations of various display units such as bet-number display unit 6, payout-number display unit 8, credit-number display unit 9 and lower liquid crystal panel 5C.

The first image control circuit 68 and the second image control circuit 69 have a same structure. The first image control circuit 68 displays an effect screen in the upper liquid crystal panel 5A and the second image control circuit 69 displays the symbols 180 or mini game screen 200 in the central liquid crystal panel 5B. The speaker driving circuit 72 controls the voice output by the speakers 23. The image control circuits 68, 69 will be described later.

The main CPU 32 executes a control of outputting a command signal, which causes the symbols 180 displayed in the central liquid crystal panel 5B to be scrolled when a credit is bet and then the start button is pushed, to the second image control circuit 69, a control of determining symbols that are stopped after the symbols 180 are scrolled and a control of stopping the determined symbols in the display windows 7A, 7B, 7C, 7D, 7E.

In other words, the main CPU 32 has functions of an arrangement controller for executing an arrangement control of selecting symbols to be arranged into a symbol matrix from many types of symbols and stopping the symbols in the symbol matrix from a scroll state, so as to rearrange the displayed symbols 180 as the symbol matrix after scrolling the symbols 180 displayed in the central liquid crystal panel 5B.

Herein, the second image control circuit 69 will be described in detail. Meanwhile, since the first image control circuit 68 is same as the second image control circuit 69, its description is omitted.

Figure 5:
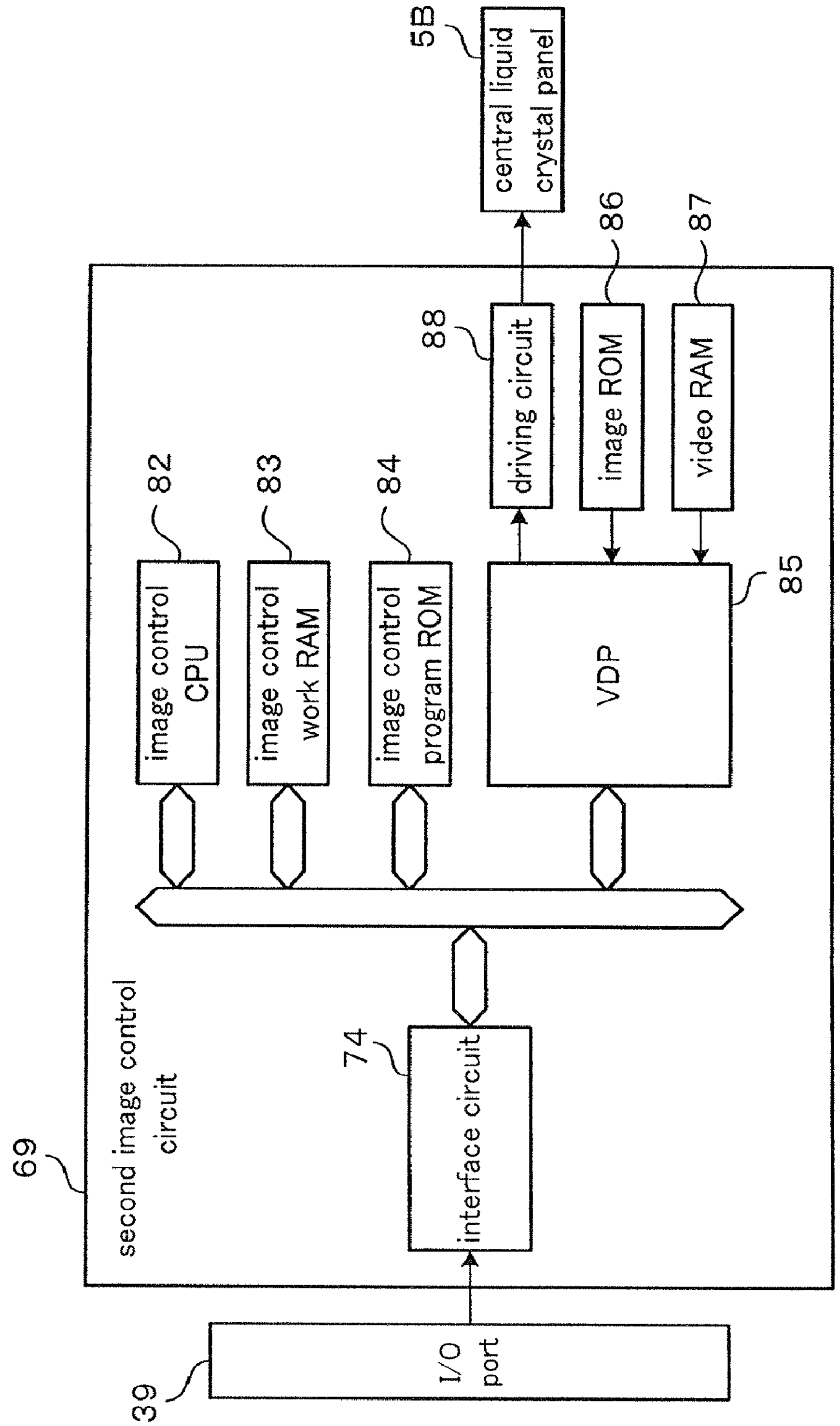
FIG. 5 is a block diagram showing an image control circuit of FIG. 4.

As shown in FIG. 5, the second image control circuit 69 controls the display of the central liquid crystal panel 5B of the variable display unit 4B. The second image control circuit 69 has an interface circuit 74 that is connected to the I/O port 39, an image control CPU 82, an image control work RAM 83, an image control program ROM 84, a VDP (Video Display Processor) 85, an image ROM 86, a video RAM 87 and a driving circuit 88.

The image control CPU 82 determines an image that is displayed in the central liquid crystal panel 5B in accordance with an image control program stored in the image control program ROM 84, based on parameters set in the microcomputer 31.

The image control program ROM 84 stores the image control program relating to the display in the central liquid crystal panel 5B or a variety of selection tables. The image control work RAM 83 serves as a temporary storage means when the image control program is executed in the image control CPU 82. The VDP 85 forms an image in accordance with a content determined in the image control CPU 82 and outputs the image to the central liquid crystal panel 5B. The image ROM 86 stores dot data for forming an image. The video RAM 87 serves as a temporary storage means when the VDP 85 forms an image. The driving circuit 88 controls the display of the central liquid crystal panel 5B, based on the VDP 85.

(Symbol, Combination and the Like)

The symbols 180 to be displayed in the display windows 7A, 7B, 7C, 7D, 7E of the slot machine 1 constitute columns of symbols, each of which consists of 22 symbols. The symbols constituting the respective columns of symbols are given with one code number of 0~21, as shown in FIG. 6. Each of the columns of symbols is constituted with a combination of symbols of "JACKPOT 7," "BLUE 7," "BELL," "CHERRY," "STRAWBERRY," "PLUM," "ORANGE" and "APPLE."

The three successive symbols in the columns of symbols are displayed (arranged) in the upper, center and lower stages 7*a*, 7*b*, 7*c* of the respective display windows 7A, 7B, 7C, 7D, 7E, respectively, so that they constitute a symbol matrix of 5 columns/3 rows. When the bet button is pushed and then the start button is pushed to start a game, the symbols constituting the symbol matrix start the scroll. When a predetermined time period elapses after the scroll starts, the scrolls of the respective symbols are stopped (rearranged).

In addition, various winning combinations are predetermined with regard to the respective symbols. The winning combination is a combination that a combination of symbols stopped on the pay line L becomes an advantageous state to the player. The advantageous state is a state in which a coin is paid out in accordance with the winning combination, a state in which the payout-number of coins is added to a credit, a state in which a bonus game is started, and the like.

Specifically, when a combination of "APPLE" symbol is stopped on the pay line L, a bonus is triggered and a gaming state is shifted to a bonus game from a basic game. In addition, when a combination of "CHERRY" symbol is stopped on the pay line L in the basic game, 20 coins (values) are paid out per one bet. When a combination of "PLUM" symbol is stopped on the pay line L in the basic game, 5 coins are paid out per one bet.

In the mean time, a bonus game is a gaming state that is more advantageous than the basic game. When a gaming state is advantageous to a player, i.e., a gaming state is more advantageous than the basic game, the other bonus game may be further adopted. For example, a state in which it is possible to obtain more coins than the basic game, a state in which it is possible to obtain a coin in a higher probability than in the basic game, a state in which the coin is less consumed than in the basic game, a free game and the like may be adopted as the other bonus game.

In the followings, each table stored in the ROM 34 of the main control substrate 71 is described with reference to FIGS. 7 to 10.

(Payout Management Table)

FIG. 7 shows a payout management table managing a payout that is awarded on the basis of a winning combination. The payout management table is stored in the ROM 34 of the main control substrate 71 and the payout information is matched to a type of the winning combination. For example, a payout corresponding to a winning combination of "BELL" is "10." A payout corresponding to a winning combination of "BLUE 7" is "40." In addition, in this embodiment, the payouts in the basic game and the free game are set to be same.

(Free Game-Number Table)

FIG. 8A shows a table that is referred to, when determining a free game-number for a point-number acquired in a mini game of the basic game. In the free game-number table of FIG. 8A, a point-number awarded in a mini game is matched to a free game-number. For example, when an accumulated point is "4," "80" free games are executed. In addition, when an accumulated point is "8," "160" free games are executed. Like this, when a mini game of the basic game results in success and more points are thus acquired, a player can continue the free game for a long time.

FIG. 8B is a table that is referred to, when determining a free game-number for a point-number acquired in a mini game of the free game. As shown in FIG. 8B, whenever acquiring a point in a mini game of the free game, the game is extended by "10" times.

In other words, the point that is acquired in a mini game of the basic game is a point for determining a game-number of a free game that will be shifted later. The point that is acquired in a mini game of the free game is a point for extending a free game that is being executed. Like this, it is possible to enable a player to actively play a mini game by relating a mini game result and an acquirable point to a game-number of the free game.

(Mini Game Start Result Determining Table)

FIG. 9 shows a table that is referred to when determining whether to start a mini game. The mini game is started approximately at the same time when the operating button 11 (start button) is pushed and the symbols 180 are scrolled. In the mini game start determining table, for each of the basic game and the free game, the random numbers are respectively allotted to a case where a mini game is started and a case where a mini game is not started. For example, in the basic game, when the random number of "0~156" is sampled, a mini game is started and when the random number of "157~256" is sampled, a mini game is not started. In addition, in the free game, when the random number of "0~199" is sampled, a mini game is started and when the random number of "200~256" is sampled, a mini game is not started.

In the mean time, the mini game may be started in only one of the basic game and the free game, or may be started in the bonus game.

(Mini Game Result Determining Table)

FIG. 10 shows a table that is referred to when a player does not push the operating button 11 (start button) in the mini game. In the mini game of this embodiment, it is determined whether the mini game ends in success, based on the operation of the player. When a player does not carry out the operation for a predetermined time period, for example until the symbols 180 being scrolled are stopped, a mini game result is randomly determined. In the mini game result determining table of FIG. 10, the random numbers are respectively allotted to a case where the mini game ends in success and a case where the mini game results in failure. For example, when the random number of "0~200" is sampled, the mini game ends in failure and when the random number of "201~256" is sampled, the mini game results in success. In other words, when a player does not carry out an operation in a mini game, a probability that the mini game will result in success is lower. Thereby, it is possible to enable a player to actively take part in the mini game.

(Display State)

An example of a display state of the display 4 (specifically, central variable display unit 4B) during the operation of the slot machine 1 is described in detail. Meanwhile, as shown in FIG. 11, the display state is described on the basis of a structure in which the display 4 arranges the symbols 180 in a video reel manner.

Figure 11:
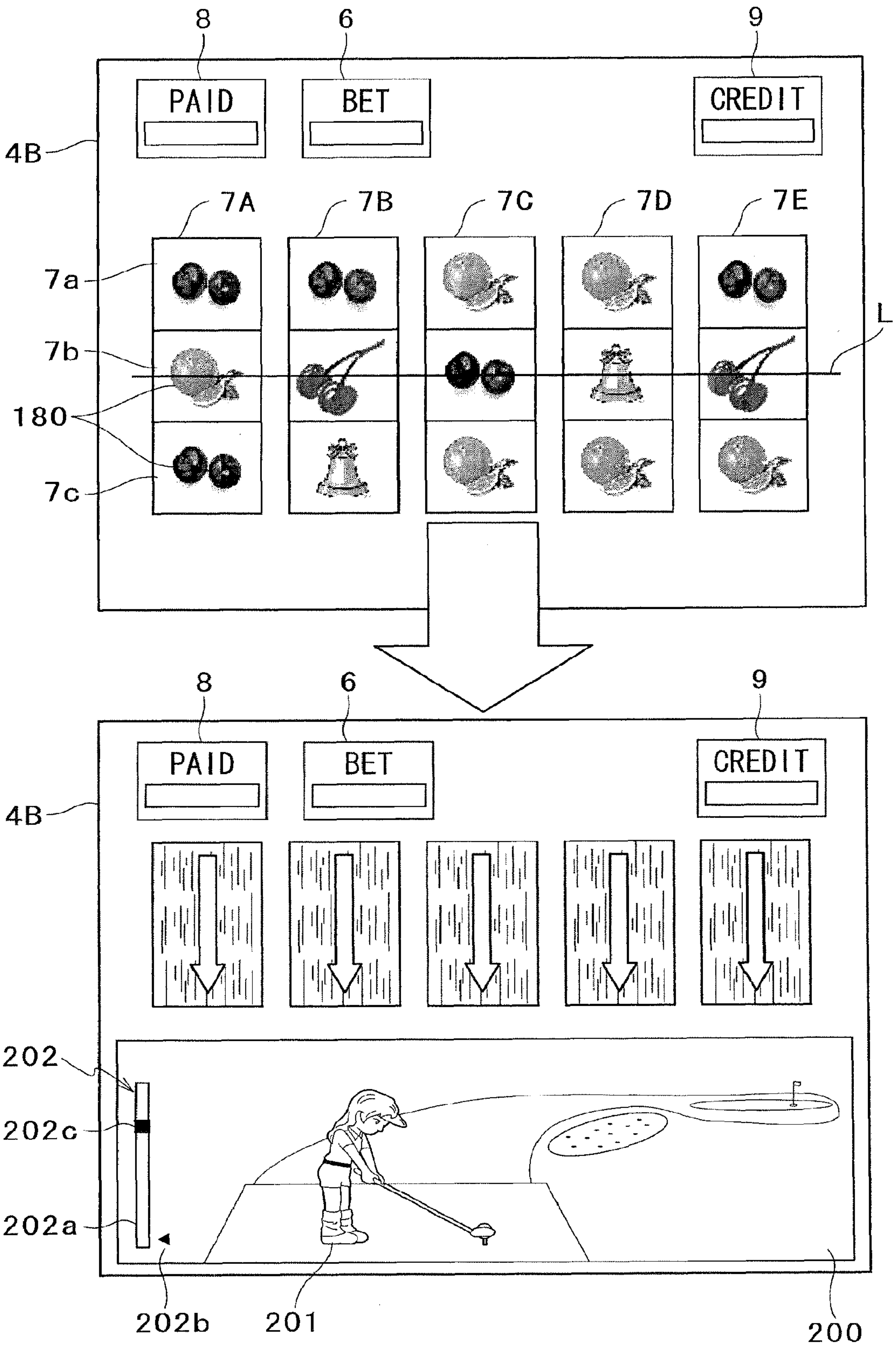
FIG. 11 illustrates a display screen.

FIG. 11 shows a display state of the display 4 when a mini game is started. When a mini game is started, the display windows 7A, 7B, 7C, 7D, 7E are moved in an upward direction from the center and a mini game screen 200 executing a mini game is displayed below the respective display windows 7A, 7B, 7C, 7D, 7E, as shown in FIG. 11.

A golf player 201 is displayed in a center of the mini game screen 200 and a golf course is displayed in an overall screen. In addition, a shot gauge 202 that adjusts an intensity of a shot is displayed in a left side of the mini game screen 200. The shot gauge 202 has a rectangular power gauge 202*a* and a triangle marker 202*b* that piston-moves along a long side of the power gauge 202*a*. The moving triangle marker 202*b* is stopped when the player pushes the operating button 11 (start button). A shot area 202*c* is set in the power gauge 202*a*. Depending on whether the moving triangle marker 202*b* is stopped in the shot area 202*c* as the player pushes the operating button 11 (start button), it is determined whether a mini game ends in success.

Figure 12A:
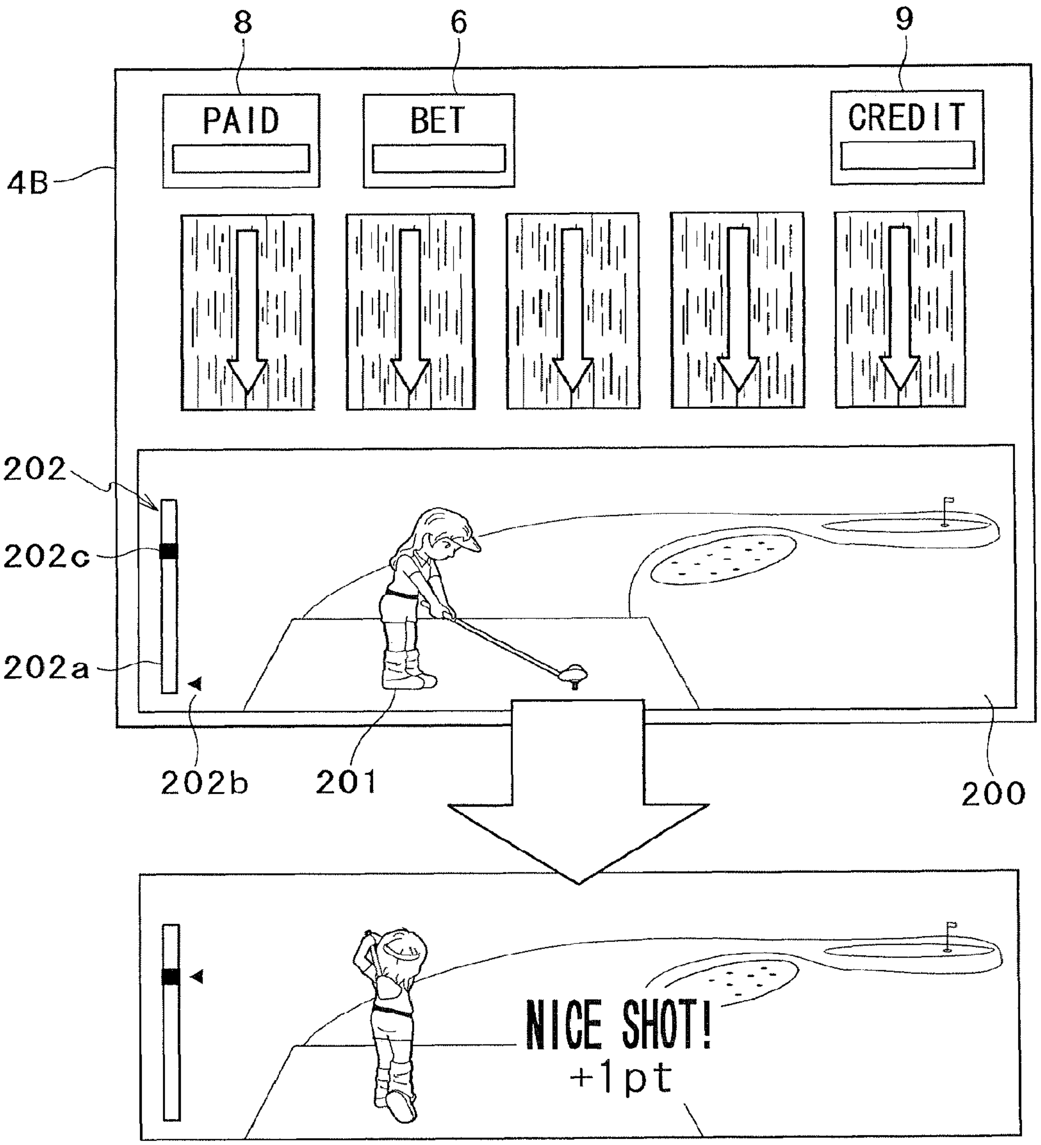
FIG. 12A illustrates a display screen.

FIG. 12A shows a shifted state of the mini game screen 200 when the mini game ends in success. In other words, FIG. 12A shows a screen displayed when a player pushes the operating button 11 (start button) to stop the moving triangle marker 202*b* in the shot area 202*c*. In a right side of the golf player 201, the letters of "Nice Shot" and an acquired point-number (1 pt) are displayed.

In the mean time, the acquired point is accumulated in the mini game of the basic game and the accumulated point-number is displayed in the mini game screen 200 (not shown). Thereby, the player can check the acquired points.

Figure 12B:
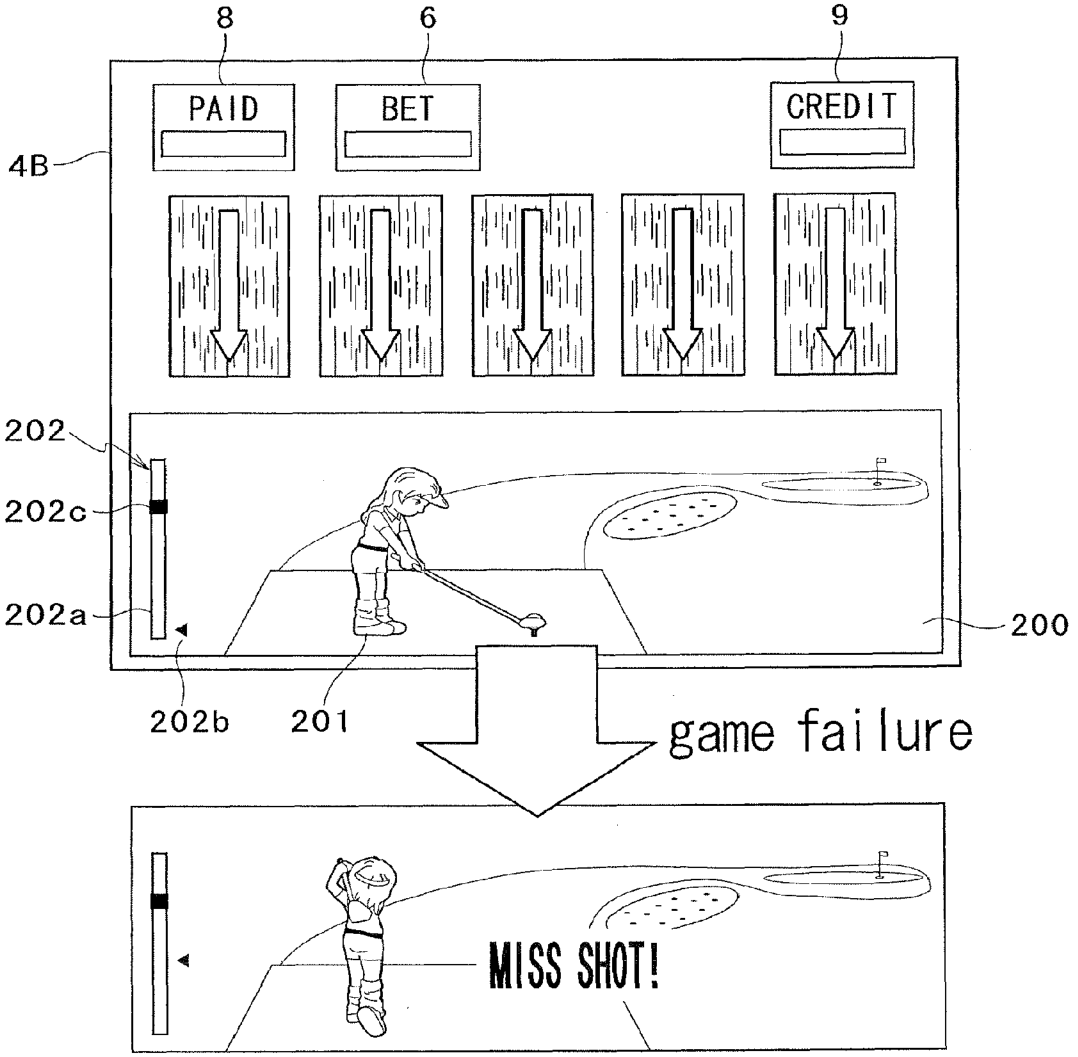
FIG. 12B illustrates a display screen.

FIG. 12B shows a shifted state of the mini game screen 200 when the mini game ends in failure. In other words, FIG. 12B shows a screen displayed when a player pushes the operating button 11 (start button) but does not stop the moving triangle marker 202*b* in the shot area 202*c*. In a right side of the golf player 201, the letters of "Miss Shot" are displayed. In this case, a point is not generated.

In the mean time, a degree of difficulty of the mini game is randomly determined and sizes of the shot area 202*c* are different depending on the degree of difficulty. For example, when the degree of difficulty is low, the shot area 202*c* becomes larger and thus it is easy to stop the triangle marker 202*b* in the shot area 202*c*. When the degree of difficulty is high, the shot area 202*c* becomes smaller and thus it is difficult to stop the triangle marker 202*b* in the shot area 202*c*.

In addition, the mini game is started and ended in a unit game from after the operating button 11 (start button) is operated and the scroll of the symbols 180 is started until the scroll is stopped. When the player does not push the operating button 11 (start button) until the scroll of the symbols 180 is stopped, the golf player 201 automatically starts a shot. In this case, it is randomly determined whether the mini game ends in success through the table of FIG. 10 and the sampling of the random number.

(Process Operation of the Slot Machine 1)

Figure 13A:
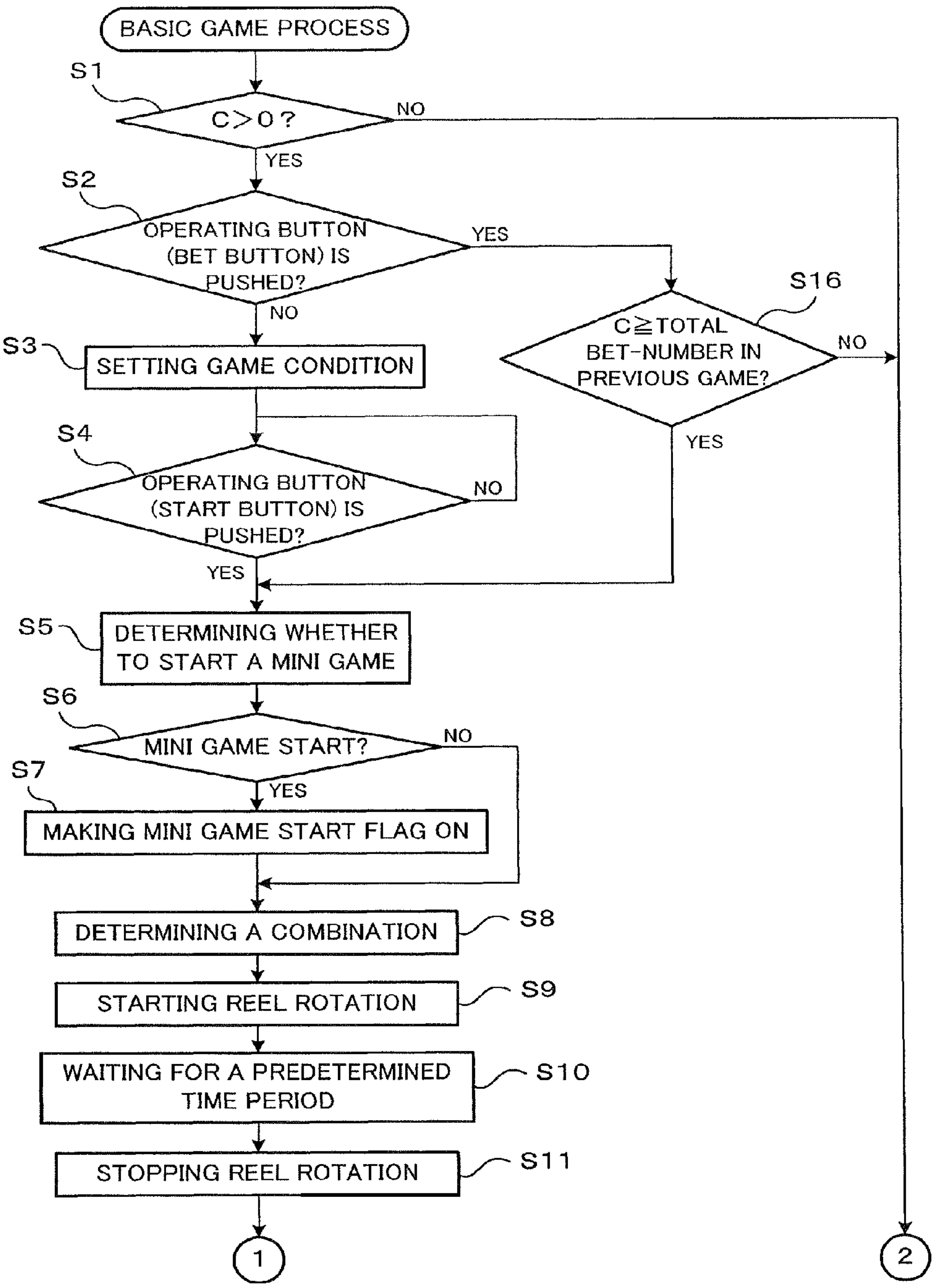
FIG. 13A is a flow chart of a basic process.
Figure 13B:
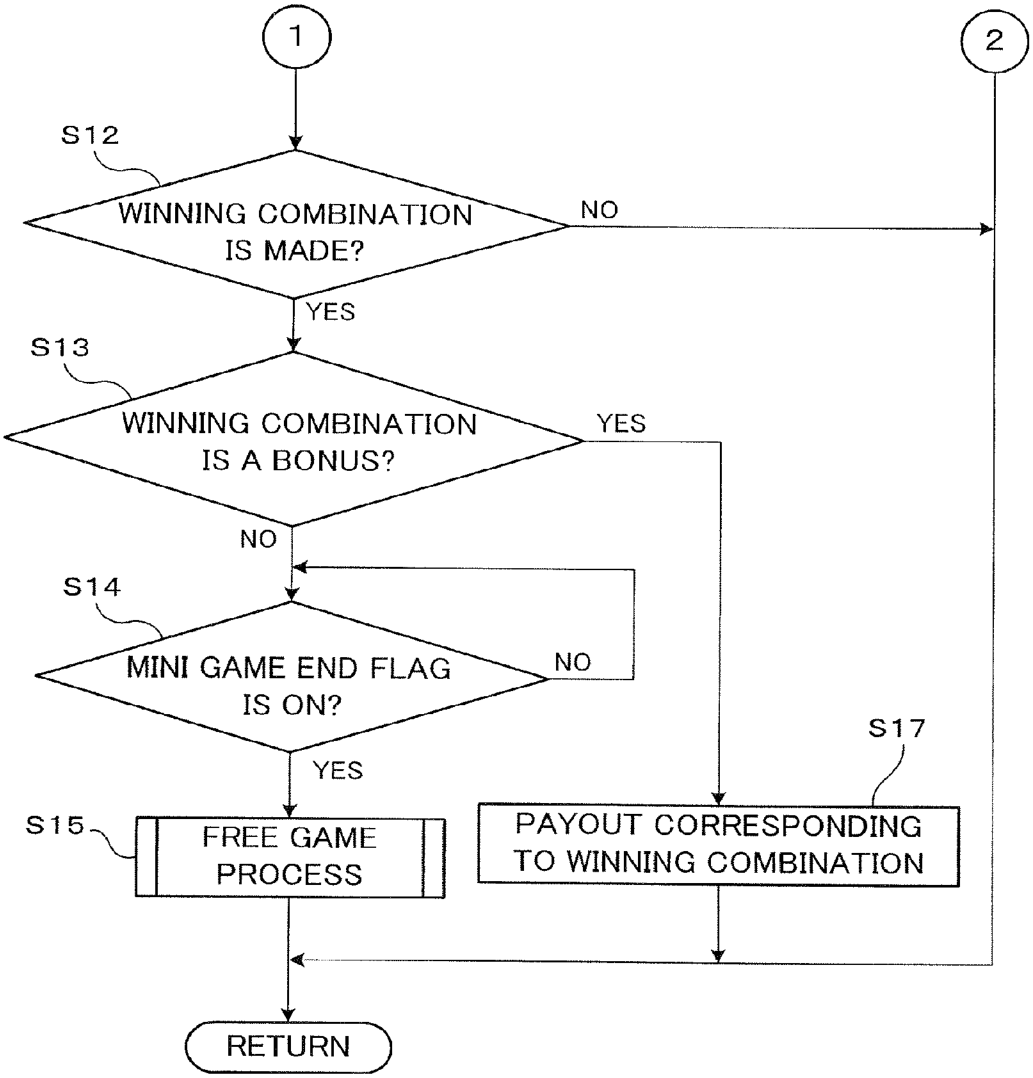
FIG. 13B is a flow chart of a basic process.

In the followings, a process that is carried out in the slot machine 1 is described. FIGS. 13A and 13B are flow charts showing process operations in the basic game of the slot machine 1, which are carried out by the main CPU 32 of the slot machine 1. A one-time routine of FIGS. 13A and 13B constitutes a unit game. On the one hand, the slot machine 1 has been started in advance. On the other hand, the parameters used in the main CPU 32 are initialized as predetermined values and the slot machine 1 is thus normally operated.

First, the main CPU 32 determines whether the credit is remained which is the remaining number of the coins inserted by the player (S1). Specifically, the main CPU 32 reads the credit-number (C) stored in the RAM 33 and carries out a process based on the credit-number read. When the credit-number (C) is "0" (Si: NO), the main CPU 32 ends this routine without carrying out any process because it cannot start a game. On the other hand, when the credit-number is "1" or more (Si: YES), the main CPU 32 determines that there remains a credit and proceeds to a S2.

Next, the main CPU 32 determines whether the operating button 11 (bet button) is pushed or not (S2). When the operating button 11 (bet button) is pushed (S2: YES), the main CPU 32 proceeds to a S16. On the other hand, when the operating button (bet button) is not pushed for a predetermined time period (S2: NO), the main CPU 32 proceeds to a S3.

When the main CPU 32 proceeds to the S3, it sets a game condition. Specifically, the main CPU 32 determines a coin-number that is bet on the pay line L in the game, based on the operation of the operating button 11 (bet button). At this time, the main CPU 32 receives an operation signal that has occurred as the operating button 11 (bet button) is pushed, and stores a bet-number on the pay line L in a predetermined memory area of the RAM 33, based on the reception number of times of the operation signal. The main CPU 32 reads the credit-number (C) stored in the predetermined memory area of the RAM 33, subtracts a total bet-number having the bet-number added thereto from the credit-number (C) read and stores the resultant value in the predetermined memory area of the RAM 33. Then, the main CPU 32 proceeds to a S4.

In the S4, the main CPU 32 determines whether the operating button 11 (start button) is pushed or not (S4). When the operating button 11 (start button) is pushed (S4: YES), the main CPU 32 proceeds to a S5.

Oh the other hand, in the S16, the main CPU 32 determines that the credit-number (C) is equal to or larger than the total bet-number in the previous game. Namely, the main CPU 32 determines whether the operating button 11 (bet button) is pushed to start a game. Specifically, when the operating button (bet button) is pushed, the main CPU 32 reads the credit-number (C) and the bet-number on the pay line L in the previous game, which are stored in the predetermined memory area of the RAM 33, and carries out a process depending on whether the credit-number (C) is equal to or larger than the total bet-number in the previous game, based on the relation of the credit-number (C) and the bet-number read. When it is determined that the credit-number (C) is less than the total bet-number in the previous game (S16: NO), the main CPU 32 ends this routine without carrying out any process because it cannot start a game.

In addition, when it is determined that the credit-number (C) is equal to or larger than the total bet-number in the previous game (S16: YES), the main CPU 32 subtracts the total bet-number in the previous game from the corresponding credit-number (C) and stores the resultant value in the predetermined memory area of the RAM 33. Then, the main CPU 32 proceeds to a S5.

In the S5, the main CPU 32 determines whether to start a mini game (S5). Specifically, the main CPU 32 determines whether to start a mini game, through the table of FIG. 9 and a sampling of the random number. Then, when it is determined to start a mini game (S6: YES), the main CPU 32 makes a mini game start flag "ON" (S7). Specifically, the main CPU 32 writes data, which indicates that a game start flag is ON, in a storage area of the mini game start flag of the RAM 33. Then, the main CPU 32 proceeds to the S7. On the other hand, when it is determined not to start a mini game (S6: NO), the main CPU 32 proceeds to a S8.

When proceeding to the S8, the main CPU 32 carries out a combination determining process. In the combination determining process, the main CPU 32 determines a combination of symbols to be stopped on the pay line L. Specifically, the main CPU 32 instructs the random number generator 35 to generate a random number and samples a random number within a predetermined range, which is generated by the random number generator 35. The main CPU 32 stores the sampled random number in the predetermined memory area of the RAM 33. In the mean time, in this embodiment, the random number is generated in the random number generator 35 that is provided to the outside of the main CPU 32. However, the random number may be generated through a calculation process of the main CPU 32, without the random number generator 35.

The main CPU 32 reads out a random number table and a winning combination table for awarding a winning, which are stored in the ROM 34, and stores the random number table and the winning combination table read in a predetermined memory area of the RAM 33. In the mean time, the main CPU 32 controls a stop display for each reel, based on the random number table.

The main CPU 32 reads out the random number table and the winning combination table stored in the predetermined memory area of the RAM 33 and adopts the random number written in the predetermined memory area of the RAM 33 as parameter to refer to the corresponding random number table, thereby determining a combination of symbols to be stopped on the pay line L. Like this, when a winning combination is determined, the main CPU 32 stores the determined winning combination table in the predetermined memory area of the RAM 33. The main CPU 32 reads out the random number and the winning combination table, which are stored in the predetermined memory area of the RAM 33, and determines a stop symbol combination to be stop-displayed, based on the random number and the winning combination table read. At this time, the symbol arrangement table stored in the ROM 34 is read out, stored in the predetermined memory area of the RAM 33 and referred to by the main CPU 32. The main CPU 32 stores the data of the determined stop symbol in the predetermined memory area of the RAM 33. In the mean time, instead of the above structure, the stop symbol may be determined for each reel with the random number table.

When determining a combination of symbols to be stopped on the pay line L, the main CPU 32 determines whether the combination of symbols to be stopped on the pay line L is a winning combination or not. When the combination of symbols to be stopped on the pay line L is a winning combination, the main CPU 32 activates a flag indicating that a payout indicating a type of the winning combination will be awarded, so as to generate a winning corresponding to the determined winning combination on the pay line L. The flag indicating that the activated flag will be awarded is stored in the predetermined memory area of the RAM 33 by the main CPU 32. Oh the other hand, when the combination of symbols to be stopped on the pay line L is not a winning combination, i.e., when it is determined a combination of "losing", the main CPU 32 does not activate the flag indicating that the winning will be awarded. Then, the main CPU 32 proceeds to a S9.

In the S9, the main CPU 32 displays an image of rotating the symbols 180 in the display windows 7A~7E. Specifically, the main CPU 32 displays an image of rotating each of the display windows 7A~7E sequentially or simultaneously, based on the symbol arrangement table (not shown) stored in the RAM 33.

When displaying an image of starting the rotation of the display windows 7A~7E, the main CPU 32 awaits that a predetermined time period elapses (S10). Then, the main CPU 32 automatically stops the rotation of the display windows 7A~7E (S11). Specifically, the main CPU 32 carries out a display of sequentially or simultaneously stopping the rotation image of the display windows 7A~7E so that the stop symbols, which correspond to the winning combination determined in the S8 on the basis of the winning combination written in the predetermined memory area of the RAM 33, are displayed in a display area having a visually interactive relation with a player. Then, the main CPU 32 proceeds to a S12.

When proceeding to the S12, the main CPU 32 determines whether a winning combination is made through the combination determining process of the S8. Specifically, the main CPU 32 carries out the determination, based on a state of the flag indicating that a winning relating to the pay line L, which is stored in the predetermined memory area of the RAM 33, will be awarded. When the flag indicating that a winning will be awarded is not activated (S12: NO), the main CPU 32 determines that a winning combination is not made, and thus ends this routine. On the other hand, when the flag indicating that a winning will be awarded is activated (S12: YES), the main CPU 32 proceeds to a S13.

When proceeding to the S13, the main CPU 32 determines whether the winning combination, which is made through the combination determining process of the S8, is "BLUE 7." Specifically, when the winning combination is "BLUE 7" (S13: YES), the main CPU 32 proceeds to a S17. On the other hand, when the winning combination is not "BLUE 7" (S13: NO), the main CPU 32 proceeds to a S14.

When proceeding to the S14, the main CPU 32 determines whether a mini game end flag is ON or not (S14). Specifically, the main CPU 32 determines whether data, which indicates that a mini game end flag is ON, is stored in a mini game end flag area of the RAM 33. When it is determined that the mini game end flag is ON, the main CPU 32 proceeds to a S15. In addition, when it is determined that the mini game end flag is not ON (S14: NO), the main CPU 32 proceeds to the S14.

When proceeding to the S15, the main CPU 32 carries out a free game process that will be specifically described later. Then, the main CPU 32 ends this routine. In addition, in the S17, the main PCPU 32 pays out the coins corresponding to the winning combination.

(Free Game Process)

Figure 14:
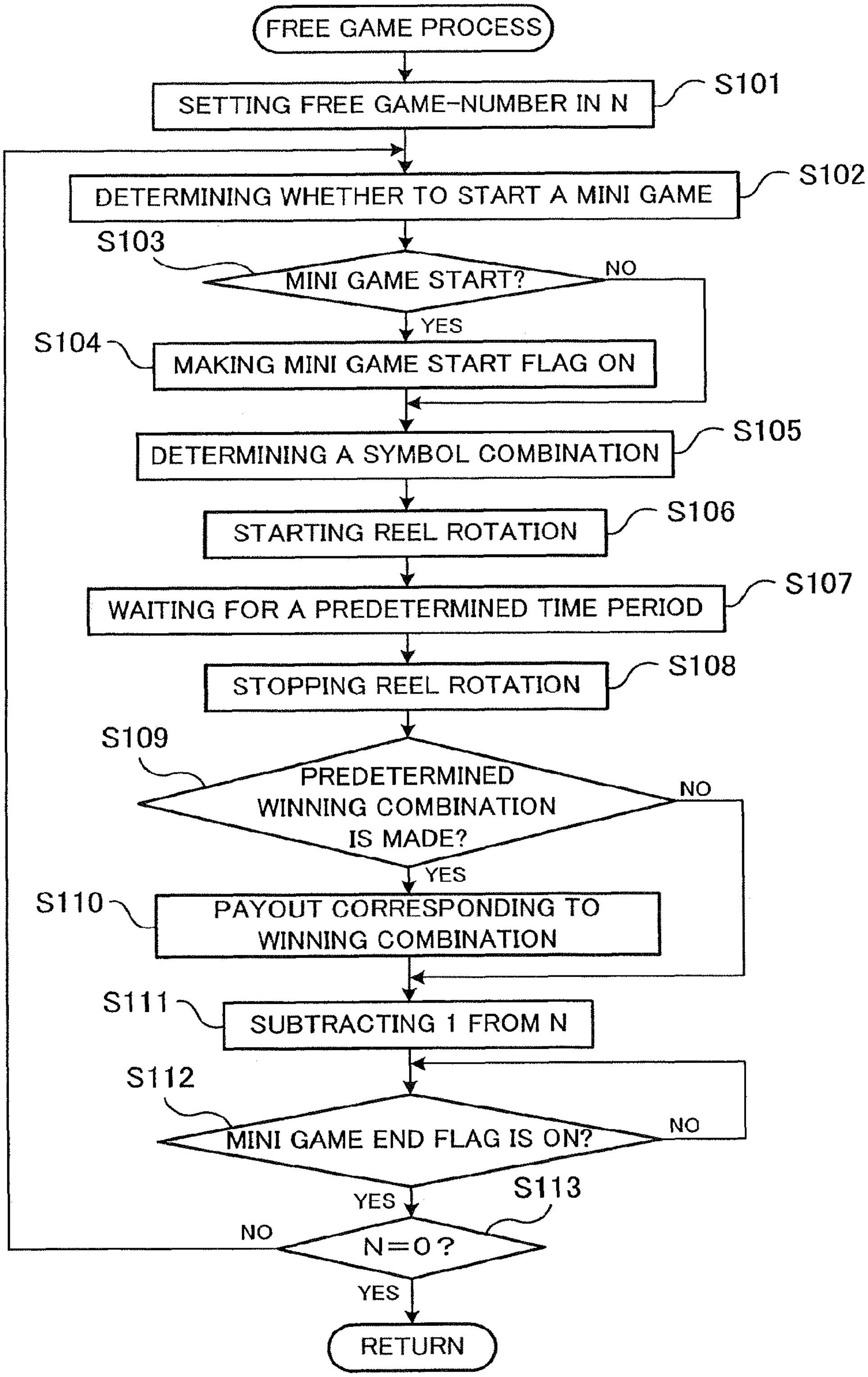
FIG. 14 is a flow chart of a free game process.

In the followings, a free game process is described with reference to FIG. 14.

First, in a S101, the main CPU 32 sets a free game-number in N and proceeds to a S102. The free game-number is determined depending on the accumulated number of points that are acquired in the mini game of the basic game.

In the S102, the main CPU 32 determines whether to start a mini game. Specifically, the main CPU 32 determines whether to start a mini game, through the table shown in FIG. 9 and the sampling of the random number. When it is determined to start the mini game (S103: YES), the main CPU 32 makes the mini game start flag "ON" (S104). Specifically, the main CPU 32 writes the data indicating that the mini game start flag is ON in the storage area of the mini game start flag of the RAM 33. Then, the main CPU 32 proceeds to a S105. On the other hand, when it is determined not to start the mini game (S103: NO), the main CPU 32 proceeds to the S105.

In the S105, the main CPU 32 carries out the combination determining process as described above and then proceeds to a S106. A difference of this combination is that the main CPU 32 refers to a random number table for a free game (not shown) as the random number table. In the S106, the main CPU 32 displays an image of starting to rotate the display windows 7A~7E and then proceeds to a S107. Then, the main CPU 32 determines whether a predetermined time period elapses (S107). When the predetermined time period elapses, the main CPU 32 proceeds to a S108.

In the S108, the main CPU 32 displays an image of stopping the rotation of the display windows 7A~7E and then proceeds to a S109. Then, the main CPU 32 determines whether a winning combination is made or not (S109). When a winning combination is not made (S109: NO), the main CPU 32 proceeds to a S111. When a winning combination is made (S109: YES), the main CPU 32 carries out the payout relating to the winning combination (S110) and then proceeds to the S111.

Specifically, the main CPU 32 refers to the payout management table of FIG. 7 to calculate a payout-number of coins, which corresponds to the winning combination. Then, the main CPU 32 reads out the credit-number stored in the predetermined memory area of the RAM 33, adds the calculated value to the credit-number read and stores the resultant value in the predetermined memory area of the RAM 33. The main CPU 32 displays the corresponding stored value in the credit-number display unit 9.

In the S111, the main CPU 32 subtracts 1 from N and proceeds to a S112. In the S112, the main CPU 32 determines whether the mini game end flag is ON or not (S112). Specifically, the main CPU 32 determines whether the data, which indicates that the mini game end flag is ON, is stored in the mini game end flag area of the RAM 33. When it is determined that the mini game end flag is ON, the main CPU 32 proceeds to a S113. In addition, when it is determined that the mini game end flag is not ON (S112: NO), the main CPU 32 proceeds to the S112.

In the S113, the main CPU 32 determines whether N is 0 or not. When N is not 0 (S113: NO), the main CPU 32 proceeds to the S102. When N is 0 (S113: YES), the main CPU 32 ends this routine.

(Mini Game Process)

Figure 15:
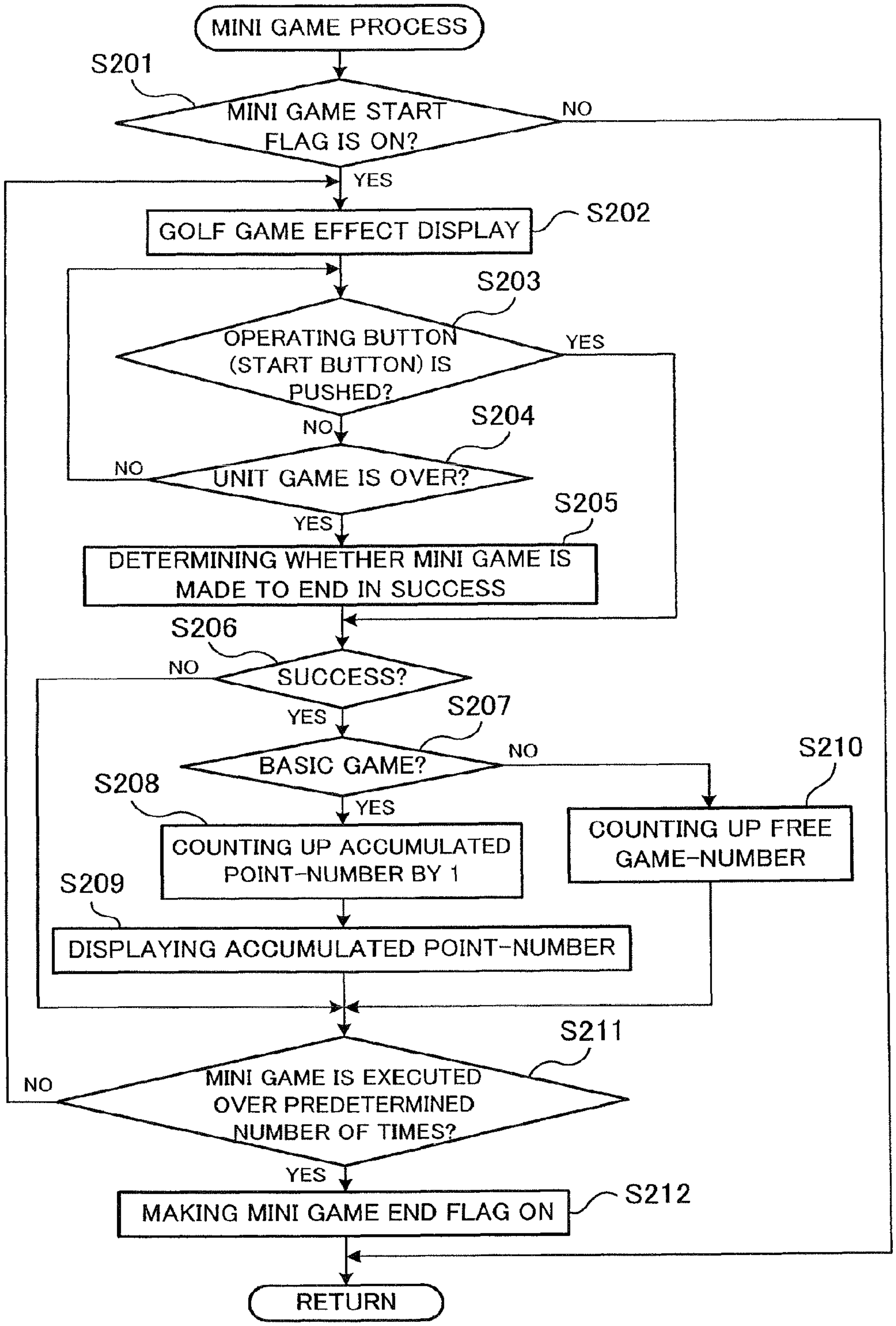
FIG. 15 is a flow chart of a mini game process

In the followings, a mini game process is described with reference to FIG. 15.

First, in a S201, the main CPU 32 determines whether the mini game start flag is ON or not. Specifically, the main CPU 32 determines whether the data, which indicates that the mini game star flag is ON, is stored in the game start flag area of the RAM 33. When it is determined that the mini game start flag is ON (S201: YES), the main CPU 32 proceeds to a S202. When it is determined that the mini game start flag is not ON (S201: NO), the main CPU 32 ends this routine. In the S202, the main CPU 32 displays the mini game screen 200 in the central variable display unit 4B. Then, the main CPU 32 proceeds to a S203.

In the S203, the main CPU 32 determines whether the operating button 11 (start button) is pushed or not. When the operating button 11 (start button) is not pushed (S203: NO), the main CPU 32 proceeds to a S204. Then, the main CPU 32 determines whether a unit game is over (S204). In other words, the main CPU 32 determines whether the reels are stopped in the basic game or free game. When the unit game is not over (S204: NO), the main CPU 32 proceeds to the S203. When the unit game is over (S204: YES), the main CPU 32 proceeds to a S205. On the other hand, when the operating button 11 (start button) is pushed (S203: YES), the main CPU 32 proceeds to a S206.

In the S205, the main CPU 32 determines whether the mini game is made to end in success (S205). Specifically, the main CPU 32 determines whether the mini game is made to end in success, through the table shown in FIG. 10 and the sampling of the random number. Then, the main CPU 32 proceeds to a S206.

In the S206, the main CPU 32 determines whether the mini game ends in success. Specifically, when the player pushes the operating button 11 (start button) in the S203, the main CPU 32 determines whether the push operation is properly carried out, i.e., whether the moving triangle marker 202*b* is stopped in the shot area 202*c* of the power gauge 202*a*. In addition, when the player does not push the operating button 11 (start button) in the S203, the main CPU 32 determines whether it is determined that the mini game is made to end in success in the S205.

When the mini game does not end in success (S206: NO), the main CPU 32 proceeds to a S211. On the other hand, when the mini game ends in success (S206: YES), the main CPU 32 determines whether the current game is a basic game or not (S207). When the current game is not a basic game (S207: NO), i.e., when the current game is a free game, the main CPU 32 proceeds to a S210. In the S210, the main CPU 32 counts up the free game-number. Specifically, the main CPU 32 extends the free game-number by "10" games. Then, the main CPU 32 proceeds to a S211.

On the other hand, when the current game is a basic game (S207: YES), the main CPU 32 counts up the accumulated point-number by 1 (S208). Specifically, the main CPU 32 adds "1" to the accumulated point-number stored in the predetermined area of the RAM 33 and stores the added value in the predetermined area of the RAM 33. Then, the main CPU 32 displays the accumulated point-number after the count up in the mini game screen (S209). Then, the main CPU 32 proceeds to a S211.

In the S211, the main CPU 32 determines whether the mini game is executed over the predetermined number of times (S211). The predetermined number of times may be appropriately changed. For example, in this embodiment, the mini game is a golf game and 18 times of the mini game may be thus executed, in a sense of 18 holes of a golf game. When the mini game is not executed over the predetermined number of times (S211: NO), the main CPU 32 proceeds to the S202. On the other hand, when the mini game is executed over the predetermined number of times (S211: YES), the main CPU 32 makes the mini game end flag ON (S212). Specifically, the main CPU 32 writes the data indicating that the mini game end flag is ON in the mini game end flag area of the RAM 33. Then, the main CPU 32 ends this routine.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the invention, not to limit it. In addition, it will be understood by those skilled in the art that the other structures, systems, methods and the like included in the spirit of the invention can be derived from the spirit of the invention described in the specification. Accordingly, it should be considered that the invention covers equivalent structures thereof without departing from the spirit and scope of the invention as defined in the following claims. Further, the abstract is provided so that an intellectual property office and a general public institution or one skilled in the art who is not familiar with patent and legal or professional terminology can quickly analyze the technical features and essences of the invention through a simple investigation. Accordingly, the abstract is not intended to limit the scope of the invention that should be evaluated by the claims. In addition, it is required to sufficiently refer to the documents that have been already disclosed, so as to fully understand the objects and effects of the invention.

The above descriptions include a process that is executed on a computer or computer network. The above descriptions and expressions have been provided so that the one skilled in the art can understand the invention most effectively. In the specification, the respective steps used to induce one result or blocks having a predetermined processing function should be understood as a process having no self-contradiction. In addition, the electrical or magnetic signal is transmitted/received and written in the respective steps or blocks. Although the processes in the respective steps or blocks embody the signal as a bit, value, symbol, character, term, number and the like, it should be noted that these have been used for the convenience of descriptions. Further, although the processes in the respective steps or blocks have been often described as an expression common to a human action, the process described in the specification is executed by a variety of devices in principle. In addition, the other structures necessary for the respective steps or blocks are apparent from the above descriptions.

The invention claimed is:

1. A gaming machine comprising: a display having several areas that arrange many symbols; a bet unit that bets a value; and a game controller, wherein the game controller is operated (a) to rearrange symbols in the several areas when the value is bet, (b) to determine a winning based on the symbols rearranged, (c) to shift from a basic game to a free game in which the value can be less consumed than in the basic game, when a predetermined condition is satisfied, (d) to determine whether to execute a mini game at least during execution of the free game through a mini game start result determining table and a sampling of a random number, (e) to determine whether part of the free game has ended, when the mini game is executed, (f) to determine whether the mini game results is a success, when the unit of the free game is over, (g) to award a point to a player, when the mini game result is success, and (h) to increment a number of accumulated free games depending on the number of points awarded, wherein the winning based on the symbols rearranged is able to occur in the free game and the basic game but does not occur in the mini game.

2. The gaming machine of claim 1, wherein when the mini game result is a success, the game controller is operated to determine whether a current game is the basic game or the free game, and when the current game is the basic game, the number of accumulated free games is incremented by 1 and when the current game is the free game, number of accumulated free games is incremented by 10.

3. The gaming machine of claim 1, wherein the mini game is a golf game.

* * * * *